(12) United States Patent
Shaffer

(10) Patent No.: US 10,785,335 B2
(45) Date of Patent: Sep. 22, 2020

(54) SECURE AND PRIVATE WEB BROWSING SYSTEM AND METHOD

(71) Applicant: TRACEFREE CORP., Wilmington, DE (US)

(72) Inventor: Scott Shaffer, Wilmington, DE (US)

(73) Assignee: TRACEFREE CORP., Wilmington, DE (US)

( * ) Notice: Subject to any disclaimer, the term of this patent is extended or adjusted under 35 U.S.C. 154(b) by 223 days.

(21) Appl. No.: 16/109,065

(22) Filed: Aug. 22, 2018

(65) Prior Publication Data

US 2019/0068739 A1 Feb. 28, 2019

Related U.S. Application Data

(60) Provisional application No. 62/548,813, filed on Aug. 22, 2017.

(51) Int. Cl.

| | |
|---|---|
| *G06F 21/53* | (2013.01) |
| *H04N 21/274* | (2011.01) |
| *H04L 29/08* | (2006.01) |
| *G06F 16/957* | (2019.01) |
| *H04L 29/06* | (2006.01) |
| *G06F 21/62* | (2013.01) |
| *H04N 21/218* | (2011.01) |

(Continued)

(52) U.S. Cl.
CPC .......... *H04L 67/28* (2013.01); *G06F 16/9574* (2019.01); *G06F 21/53* (2013.01); *G06F 21/6245* (2013.01); *H04L 63/0421* (2013.01); *H04L 67/02* (2013.01); *H04L 67/141* (2013.01); *H04L 67/22* (2013.01); *H04L 67/327* (2013.01); *H04N 21/274* (2013.01); *H04N 21/21815* (2013.01); *H04N 21/2343* (2013.01); *H04N 21/2347* (2013.01); *H04N 21/25891* (2013.01); *H04N 21/8173* (2013.01)

(58) Field of Classification Search
None
See application file for complete search history.

(56) References Cited

U.S. PATENT DOCUMENTS

| | | | | |
|---|---|---|---|---|
| 6,917,949 B1 * | 7/2005 | Nguyen | ................ | G06F 16/957 |
| 2001/0047406 A1 * | 11/2001 | Araujo | ................ | H04L 41/0266 |
| | | | | 709/223 |

(Continued)

*Primary Examiner* — Sargon N Nano
*Assistant Examiner* — Christopher B Robinson
(74) *Attorney, Agent, or Firm* — Mark Terry

(57) ABSTRACT

A method and system for providing private web browsing includes a client module for transmitting a request to begin a browsing session to a web server and displaying video data for the browsing session from the web server. The system also includes a database that stores a browser build in a non-executable directory including at least one executable browser file. The system also includes a web server module configured for creating a temporary executable directory and copying the executable browser file to the temporary executable directory, executing the executable browser file in the temporary executable directory, starting the browsing session, wherein all browsing session files are stored in the temporary executable directory, generating video data from the browsing session and transmitting it to the client module, and, after ending the browsing session, deleting all files in the temporary executable directory.

15 Claims, 6 Drawing Sheets

(51) Int. Cl.
  *H04N 21/2343* (2011.01)
  *H04N 21/2347* (2011.01)
  *H04N 21/81* (2011.01)
  *H04N 21/258* (2011.01)

(56) References Cited

U.S. PATENT DOCUMENTS

| | | | | |
|---|---|---|---|---|
| 2007/0245409 | A1* | 10/2007 | Harris | H04L 69/10 |
| | | | | 726/5 |
| 2012/0240237 | A1* | 9/2012 | Kanevsky | G06F 16/957 |
| | | | | 726/26 |
| 2013/0133051 | A1* | 5/2013 | Riemers | G06F 21/6218 |
| | | | | 726/7 |
| 2015/0346929 | A1* | 12/2015 | Karunamuni | G06F 3/04842 |
| | | | | 715/777 |

* cited by examiner

SECURE AND PRIVATE WEB BROWSING SYSTEM AND METHOD

CROSS-REFERENCE TO RELATED APPLICATIONS

This patent applications claims priority to provisional patent application 62/548,813 filed Aug. 22, 2017 and entitled Method for Secure Private Browsing. The subject matter of provisional patent application 62/548,813 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to privacy and information security and, more specifically, to processes and systems for improving privacy and information security while browsing the World Wide Web.

BACKGROUND

When interacting with the World Word Web, such as web browsing, social media activities or online purchasing, it is common practice to disclose personal information, such as names, photographs, telephone numbers, birth dates and addresses. Public and private entities collect and process this personal data, as well as web browsing data itself, for any number of legitimate or illegitimate purposes. For example, it is customary for online retailers, merchants and marketers to collect data on users of their sites, and to merge the collected data from multiple sources to "data mine" or learn about the users' identities and their private/personal information in order to target them for advertising or other purposes. Internet surfing habits of users can contain a wealth of information about users, which can be used to "personalize" their experience.

The consequences for failing to protect the data collected about users can be very serious. For example, identity theft is a huge problem for consumers and the firms that serve them. In the U.S. alone, seven percent of adults—about 15 million—are victimized each year, with total losses of more than 50 billion. U.S. firms spend another 50 billion a year on identity-theft-prevention measures. Firms must take steps to ensure that any personal information in their possession remains secure, and that their employees understand these safeguards and how to detect and prevent potential threats, as well as ensure data privacy.

Additionally, individuals may have personal reasons for keeping their online activities private. Today it is common for individuals to browse the Internet for information related to very private matters, such as diseases, mental problems, personal relationships, religious beliefs, or unpopular political ideas. Individuals may fear being subjected to personal attacks, political persecution, divorce, or job loss if their online activities were known to their community, their families or law enforcement. Therefore, many individuals have a large stake in keeping certain online activities private and secure.

Therefore, a need exists for improvements over the prior art, and more particularly for more efficient methods and systems for enhancing privacy and information security when interacting with the World Wide Web.

SUMMARY

A system for providing private web browsing is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a system for providing private web browsing is provided that solves the above-described problems. The system includes a client module executing on a client computer communicably connected to a communications network, the client module configured for: 1) transmitting client settings and a request to begin a browsing session to a web server, over the communications network, 2) receiving and displaying video data for the browsing session from the web server, over the communications network, 3) detecting peripheral input for the browsing session and transmitting said peripheral input to the web server, over the communications network, and 4) receiving a user command to end the browsing session and transmitting said user command to the web server, over the communications network. The system also includes a database communicably connected to the communications network, the database configured for storing at least one browser build in a non-executable directory, the at least one browser build including at least one executable browser file. The system also includes a web server module executing on the web server communicably connected to a communications network, the web server module configured for: 1) receiving the client settings and the request to begin the browsing session from the client module, over the communications network, 2) creating a temporary executable directory in the database and copying the at least one executable browser file from the non-executable directory to the temporary executable directory, 3) executing the at least one executable browser file in the temporary executable directory, thereby starting the browsing session, wherein all browsing session files are stored in the temporary executable directory, 4) generating video data from the browsing session and transmitting the video data to the client module, over the communications network, 5) receiving peripheral input for the browsing session from the client module, over the communications network, and inputting the peripheral input into the browsing session, 6) receiving the command to end the browsing session from the client module, over the communications network, and 7) deleting all files in the temporary executable directory.

BRIEF DESCRIPTION OF THE DRAWINGS

The accompanying drawings, which are incorporated in and constitute a part of this disclosure, illustrate various example embodiments. In the drawings.

DETAILED DESCRIPTION

Figure 1:
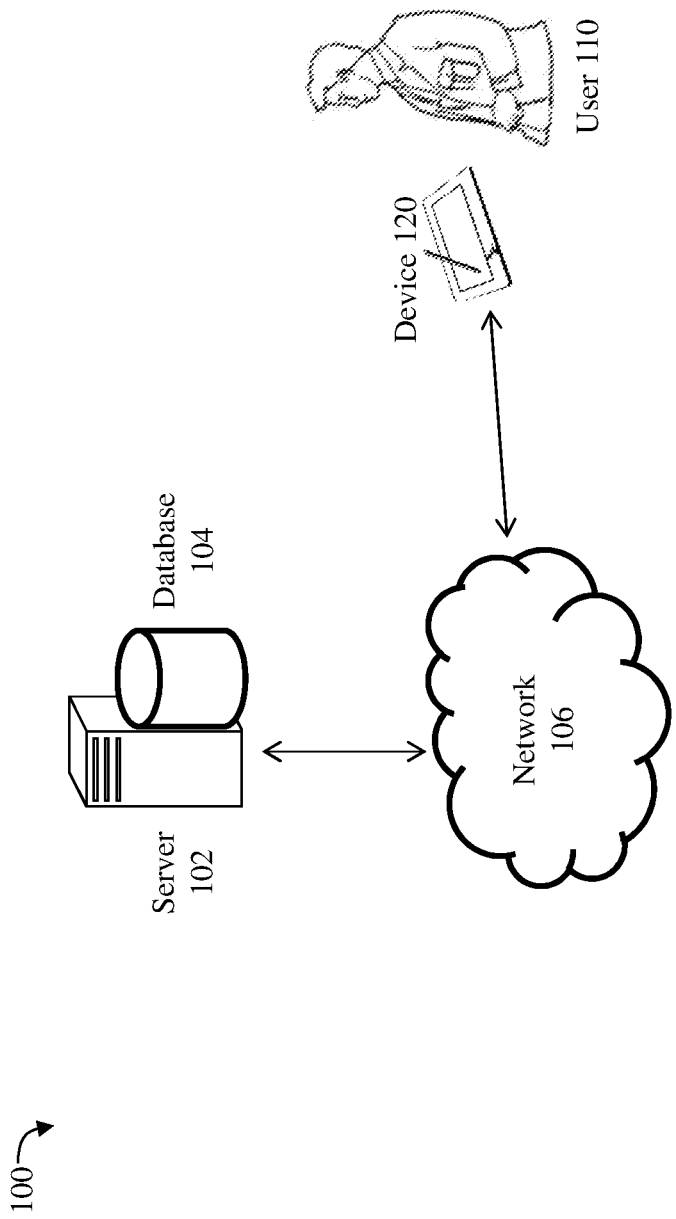
FIG. 1 is a block diagram of system for providing private and secure web browsing, according to an example embodiment.

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed subject matter improves over the prior art by providing a more efficient, automated and precise way of providing secure and private web browsing. The example embodiments provide a system and method and that allows a client module operating on a client device to browse the World Wide Web by viewing an audio/video stream of a (remotely executed) browsing session, thereby eliminating any possibility of browsing data being kept or stored at the client's device. The browsing session actually executes on a remote server, which utilizes a new browser build for each browsing session and deletes the browser build for the browsing session (and any browsing data files) after the browsing session is completed. This feature enhances the advantages of the system and improves the privacy and security of the information that passes through the system. The disclosed embodiments further improve over the prior art by encrypting any data that passes between the client and the server, so as to ensure that unauthorized parties cannot view private information associated with the browsing session.

FIG. 1 is a diagram of an operating environment 100 that supports a method and system for providing private and secure web browsing. The web server or computing device 102 may be communicatively coupled with a communications network 106, according to an example embodiment. The environment 100 may comprise any computing device 120, which may communicate with computing device 102 via a communications network 106. Computing device 120 may comprise a mobile device such as a cellular/mobile telephone, smart phone, tablet computer, laptop computer, handheld computer, desktop computer, wearable computer, or the like. Device 120 may also comprise other computing devices such as desktop computers, workstations, servers, and game consoles, for example. The computing device 120 may be connected either wirelessly or in a wired or fiber optic form to the communications network 106. Communications network 106 may be a packet switched network, such as the Internet, the World Wide Web or any local area network, wide area network, enterprise private network, cellular network, phone network, mobile communications network, or any combination of the above. The environment 100 shows that mobile computing device 120 is operated by a user 110. Server 102 and device 120 may each comprise a computing device 600, described below in greater detail with respect to FIG. 6.

Computing device 102 includes a software engine that may deliver video, audio, applications, data, program code and other information to networked devices, such as device 120. The software engine of device 102 may perform other processes such as transferring multimedia data in a stream of packets that are interpreted and rendered by a software application as the packets arrive. FIG. 1 further shows that device 102 includes a database or repository 104, which may be a relational database comprising a Structured Query Language (SQL) database stored in a SQL server. Computing device 120 may also include its own database, either locally or via the cloud. The database 104 may serve user or web browsing data, as well as related information, which may be used by device 102 and computing device 120.

Device 102, and computing device 120 may each include program logic comprising computer source code, scripting language code or interpreted language code that perform various functions of the disclosed embodiments. In one embodiment, the aforementioned program logic may comprise program module 607 in FIG. 6. It should be noted that although FIG. 1 shows only one computing device 120, and one web server 102, the system of the disclosed embodiments supports any number of servers, and computing devices connected via network 106. Also note that although server 102 is shown as a single and independent entity, in one embodiment, server 102 and its functionality can be realized in a centralized fashion in one computer system or in a distributed fashion wherein different elements are spread across several interconnected computer systems.

The database 104 may include a user record for each user 110. A user record may include: identifying information for the user (name, address, phone number, zip code, etc.), a handle for the user, a unique identifier, a password or other authentication key for the user, information pertaining to permissions attributed to the user, information pertaining to previous web browser sessions, etc. A user record may further include additional data, such as payment information, subscription information, electronic payment data (such as credit card date), etc.

The database 104 may further include a directory structure that is utilized during the process for providing private and secure web browsing. In one embodiment, the database 104 includes a non-executable directory in which is stored a web browser build. A non-executable directory is a storage area in a file system, wherein the operation system (OS) that regulates that file system does not consider that storage area as one that holds executable program files. A web browser build or browser build is a set of files, folders and directories that include all elements necessary to properly execute a web browser program so as to properly function. A browser build includes at least one or more sub-directories, at least one executable browser file, resource files and library files. Additionally, a browser build may also include library files related to the OS, registry details for the OS and related permissions, browser plug-ins (i.e., Flash, Shockwave, a PDF viewer, etc.), and web apps. A web app is a client-server computer program which the client runs in the web browser itself. Common web applications include webmail, online retail sales, online auctions, wikis, instant messaging services and many other functions. Web apps can be downloaded, installed and executed in the browser itself, such as games downloaded from the Chrome Web Store and run in the browser itself. Resource files are typically any non-executable data file used by an application, such as image, audio, and video files. Library files are precompiled routines that a program can use. The routines, sometimes called modules, may be stored in object format. An executable file is a type of computer file that runs a computer program when it is opened.

Figure 2:
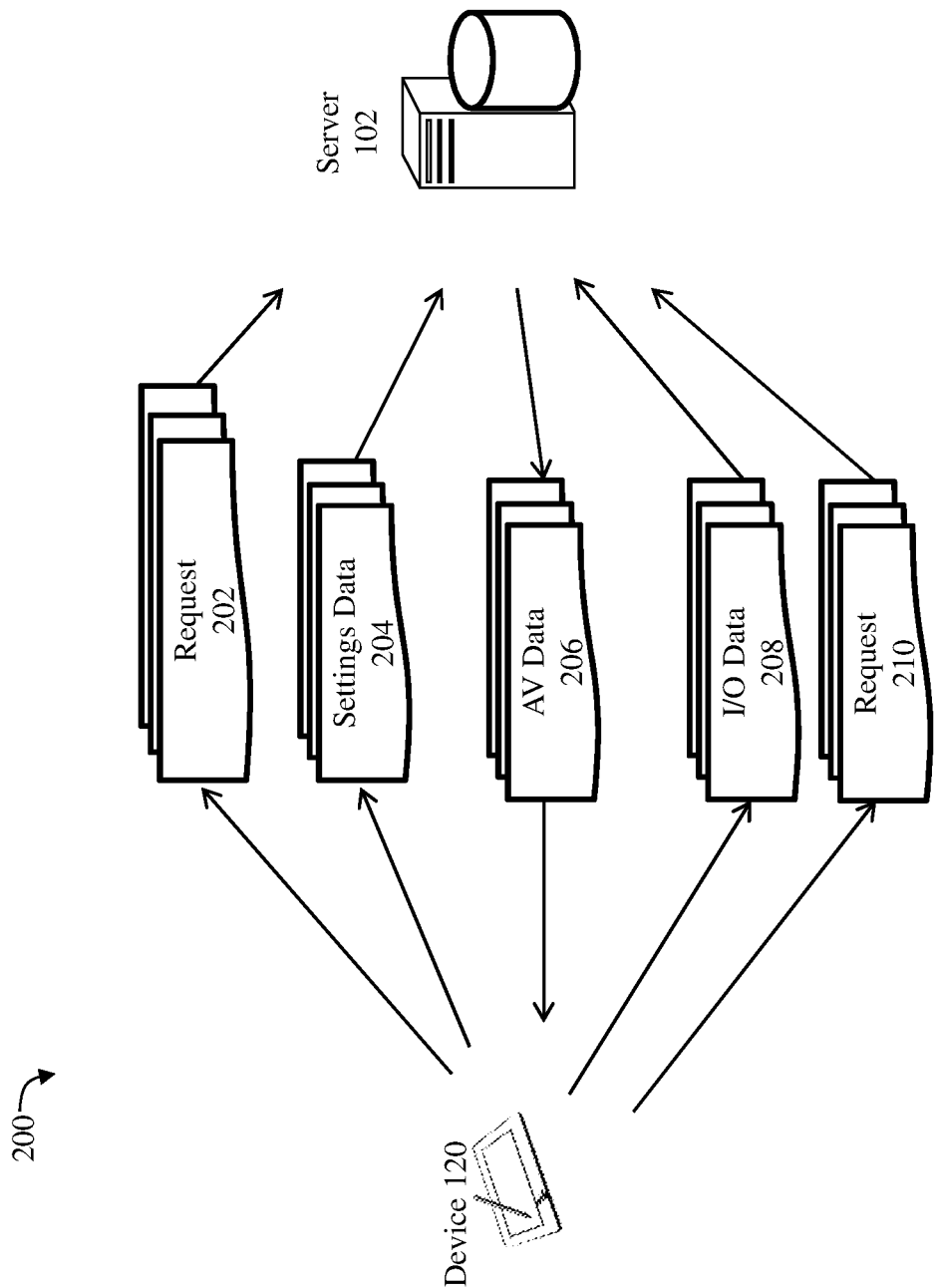
FIG. 2 is a diagram showing the data flow of the general process and method for providing private and secure web browsing, according to an example embodiment.
Figure 3:
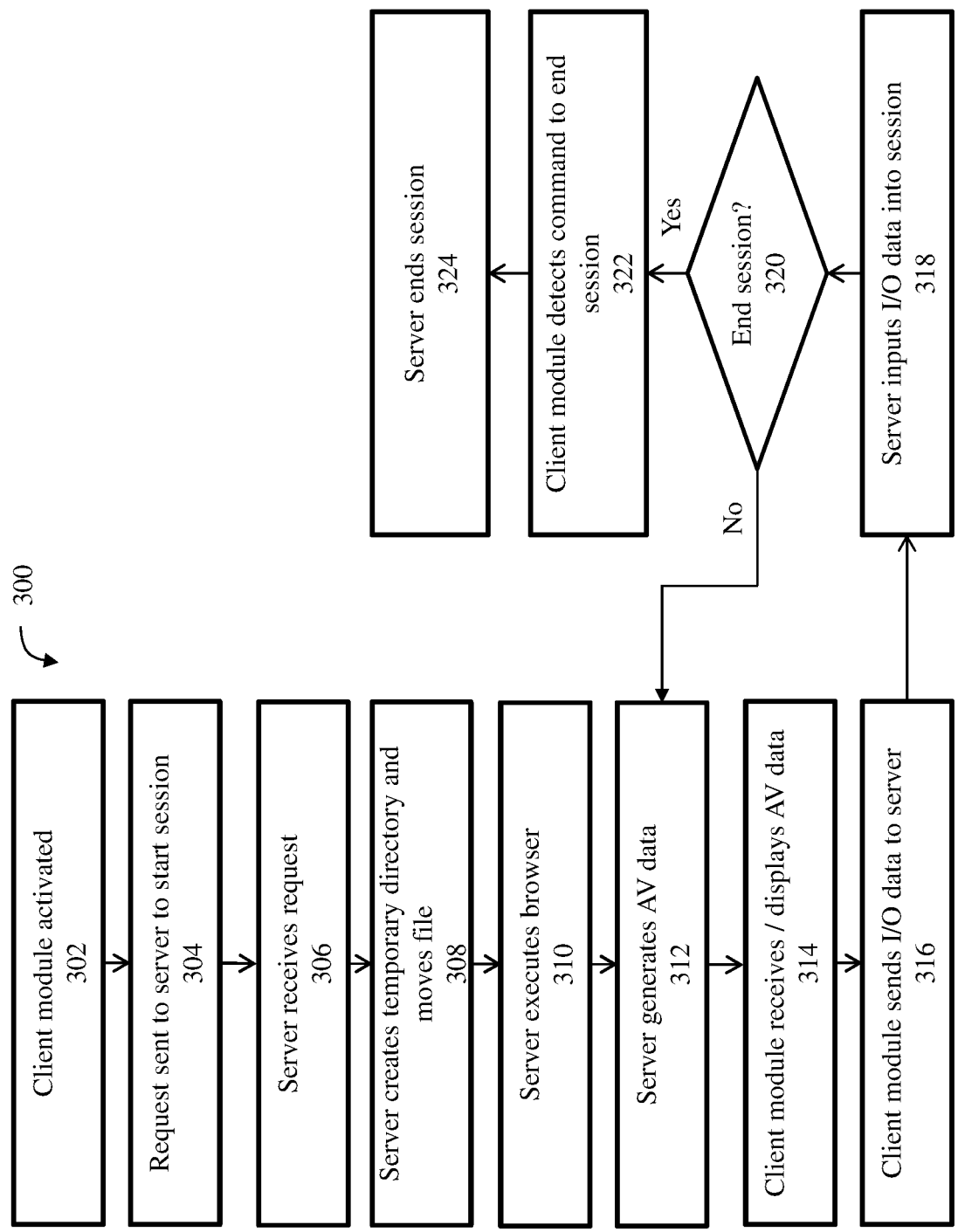
FIG. 3 is a flow chart showing the control flow of the process and method for providing private and secure web browsing, according to an example embodiment.

Generally, environment 100 may be used when user 110 attempts to browse or utilize the Internet or the World Wide Web securely and privately. The user 110 uses his device 120 to open a connection to the web server 102 and initiate a web browsing session. FIG. 3 is a flow chart showing the control flow of the general process 300 for providing secure and private web browsing, according to an example embodiment. Process 300 describes the steps that begin to occur when the user 110 interfaces with server 102 to engage in secure and private web browsing. The process 300 is described with reference to FIG. 2, which shows the general data flow 200 of the process 300 for providing secure and private web browsing.

Prior to the beginning of the process 300, it is assumed that the user 110 has downloaded and installed a client computer program (i.e., a client module) on his device 120. It is also assumed that the database 104 includes at least one non-executable directory in which is stored a web browser build, as described above.

Process 300 starts in earnest with step 302 wherein a user 110 activate the client module on his client device 120. Next, in step 304, the client module sends a request 202 to the server 102 to initiate a browsing session. The request 202 may be embedded in an HTTP request. Also, in step 304, the client module may send client settings 204 to the server 102, wherein the client settings may include favorites (such as frequently visited web sites), login credentials (for one or more web sites) and viewing preferences (such as text size). In step 306, the web server module on the server 102 receives the request 202 and client settings 204.

Next, in step 308, the web server module on the server 102 creates a temporary executable directory in the database 104 and copies the at least one executable browser file 412 from the non-executable directory to the temporary executable directory. The web server module on the server 102 may also copy all other web browser build files (such as resource files 414 and library files 416) from the non-executable directory to the temporary executable directory. The web server module on the server 102 may also enter operating system (OS) registry settings (necessary for running the web browser module) into the OS registry, which will be removed once the browsing session ends. Also, in step 308, the web server module on the server 102 may complete the install of the web browser build.

Then, in step 310, the web server module on the server 102 executes the at least one executable browser file in the temporary executable directory, thereby starting the browsing session, wherein all browsing session files are stored in the temporary executable directory. Browser session files may include a cache of web pages. Browser session files may also include cookies, temporary plug-ins (such as Flash), temporary databases, temporary scripts, temporary web site local storage, video cache files, image cache files and user preferences, such as passwords, zoom view selections and other viewing preferences.

In step 312, the web server module on the server 102 generates audio/video data 206 from the browsing session and sends the audio/video data 206 to the client module on client device 120. In step 314 the client module on client device 120 receives the audio/video data 206 from the browsing session and displays it on, and/or plays it in, the client device 120.

In step 316, the client module on client device 120 detects peripheral input/output data 208 (such as mouse input data, keyboard input data, touchscreen input data, etc.) and transmits it to the web server module on the server 102. In step 318, web server module on the server 102 receives the peripheral input/output data 208 and enters the data 208 into the browsing session.

In step 320, the client module on client device 120 determines whether the user 110 has entered a command to end the current browsing session. The user 110 may interact with the client module via mouse, keyboard or audio input to enter a command to end the current browsing session. If the client module determines that the user 110 has entered such as command, then control flows to step 322. Otherwise, if the client module determines that the user 110 has not entered such as command, then control flows back to step 312.

In step 322, the client module on client device 120 detects the command to end the browsing session and transmits a request 210 to end the browsing session to the web server module on the server 102. In step 324, web server module on the server 102 receives the receives the command and proceeds to end the browsing session by stopping the at least one executable browser file from executing. In step 324, the web server module on the server 102 deletes all files in the temporary executable directory 420 including the executable browser file 412. Also, in step 324, the web server module on the server 102 uninstalls the browser build, such as removing OS registry settings necessary for running the web browser module from the OS registry.

In one embodiment, any data sent from the client module on client device 120 to the server 102 is encrypted. Also, in another embodiment, any data send from the server 102 to the client module on client device 120 is encrypted.

Figure 4:
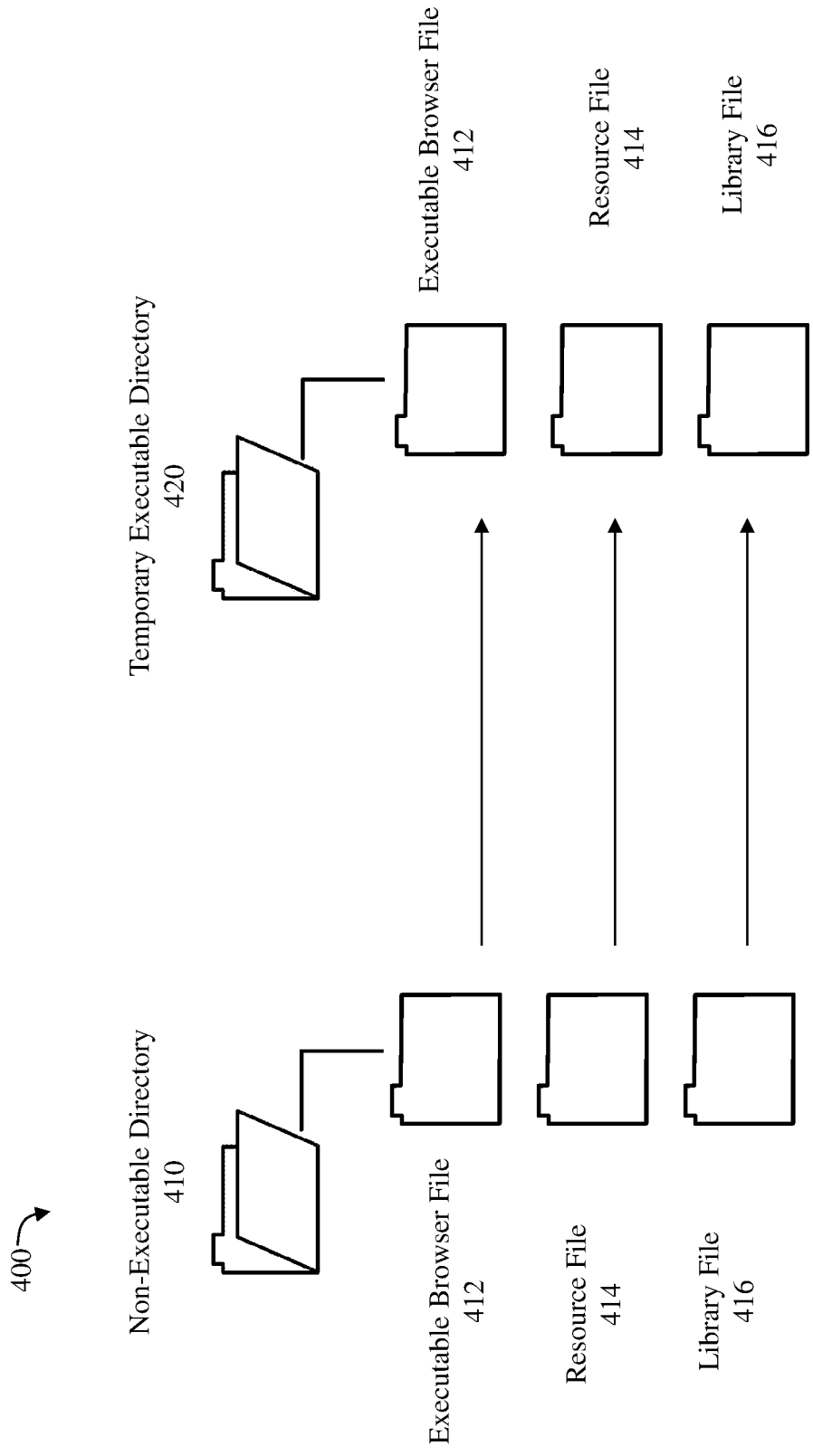
FIG. 4 is an illustration showing the directory structure of the process and method for providing private and secure web browsing according to an example embodiment.

FIG. 4 is an illustration showing the directory structure 400 of the process and method for providing private and secure web browsing according to an example embodiment. FIG. 4 shows a non-executable directory 410 stored on database 104. A non-executable directory is a storage area in a file system, wherein the OS that regulates that file system does not consider that storage area as one that holds executable program files. FIG. 4 also shows a temporary executable directory 420 that is stored on database 420. An executable directory is a storage area in a file system, wherein the OS that regulates that file system considers that storage area as one that holds executable program files. An example would be the "C://Program Files" directory in the Microsoft Windows 10 OS, which is considered a storage area that holds executable program files. FIG. 4 shows that the non-executable directory 410 includes a web browser build that comprises at least one executable browser file 412, at least one resource file 414 and at least one library file 416. The browser build may also include other files, which are defined in greater detail above. FIG. 4 also shows that the executable browser file 412 is copied from the non-executable directory 410 to the temporary executable directory 420.

Figure 5:
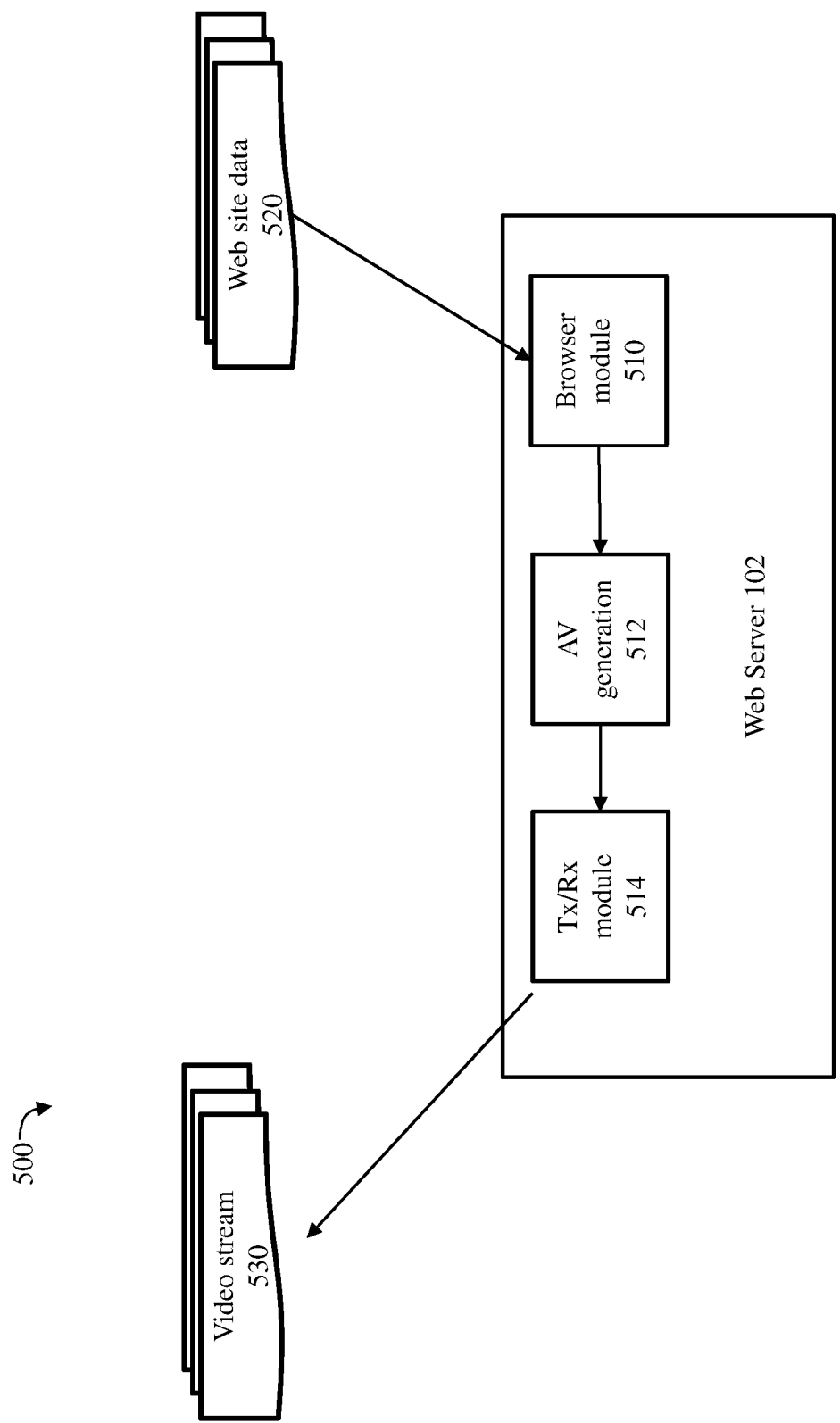
FIG. 5 is an illustration showing the sub-process of audio/video processing for the general process and method for providing private and secure web browsing, according to an example embodiment.

FIG. 5 is an illustration showing the sub-process 500 of audio/video processing for the general process and method for providing private and secure web browsing, according to an example embodiment. FIG. 5 shows that the web server 102 includes a web browser module 510 that performs the well-known functions of a web browser, including fetching information resources from the World Wide Web and displaying them on a user's device. The functionality of storing favorites, cookies, or any other data after a restart may be removed from the web browser module 510. The web browser module 510 may not have the capability of writing data to the server 120 or database 104 to install plugins and or add to the server operating system (OS) registry. Plugins may be integrated from the browser build associated with the web browser module 510.

The data and information fetched from a web site is designated as web site data 520, which may include, for example, text, HTML code, audio data, video data, etc. The web browser module 510 holds only the address (such as the IP address) of the web site being browsed, and not the address of the client module operating on the client device 120.

FIG. 5 shows that the web server 102 also includes an audio/video generation module 510 that takes the web site data 520 and converts it to an audio/video stream 530. The stream 530 may be compressed using an audio and/or video coding format and may be assembled in a bitstream from the streaming server 102 to the streaming client 120 using a transport protocol. The stream 530 may also be encrypted. FIG. 5 shows that the web server 102 also includes a transmit/receive module 514 that transmits the audio/video stream 530 to the client module on the client device 120. The transmit/receive module 514 may also receive peripheral input/output data 208 from the client module on the client device 120. The transmit/receive module 514 may encrypt the audio/video stream 530 before transmitting it to the client module on the client device 120.

Figure 6:
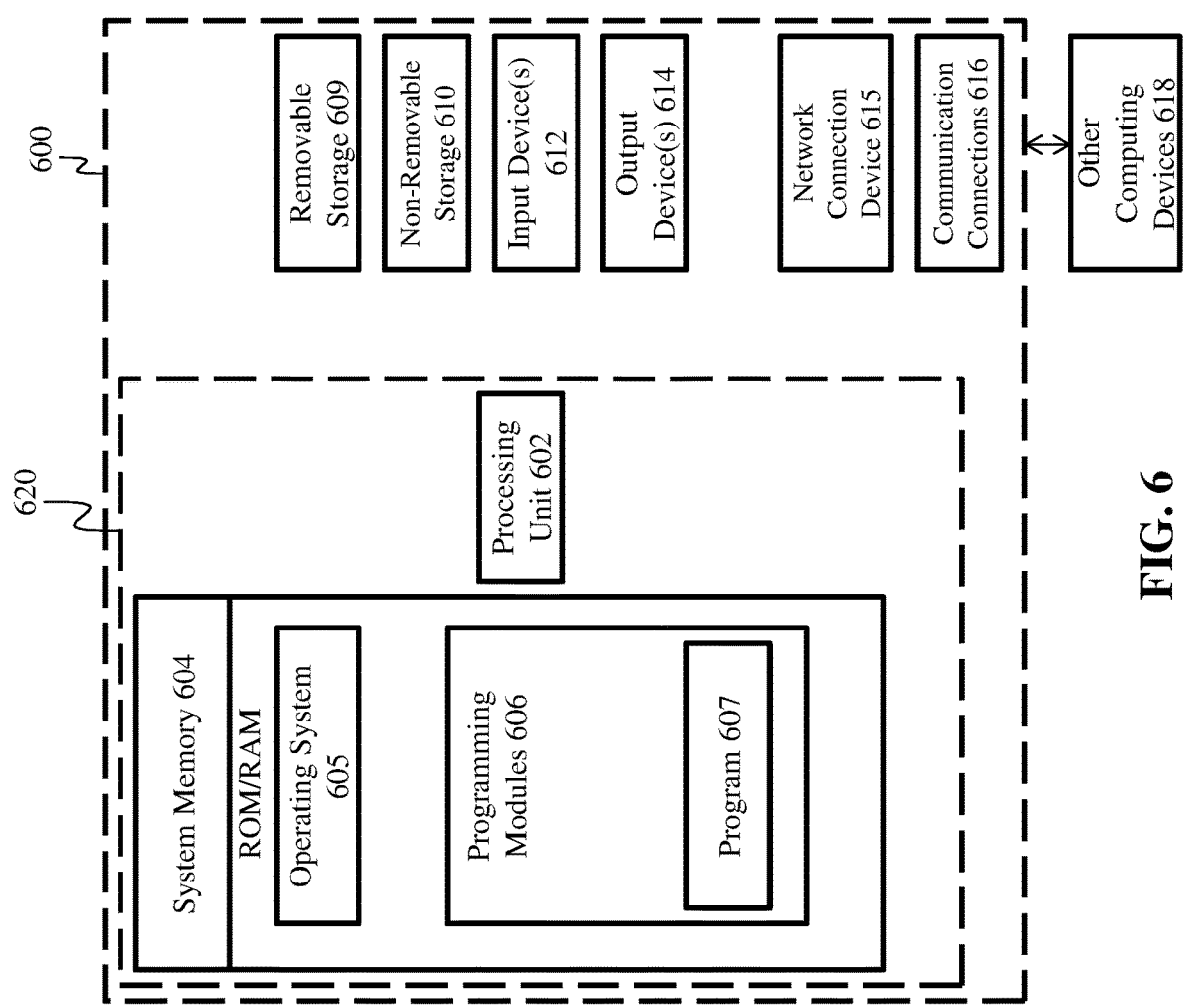
FIG. 6 is a block diagram of a system including a computing device, according to an example embodiment.

FIG. 6 is a block diagram of a system including an example computing device 600 and other computing devices. Consistent with the embodiments described herein, the aforementioned actions performed by server 102 and device 120 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for system 100 and process 300, as described above. Process 300 may operate in other environments and are not limited to computing device 600.

With reference to FIG. 6, a system consistent with an embodiment may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random-access memory (RAM)), non-volatile (e.g. read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions of server 102 and device 120. Furthermore, embodiments may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information, and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. Computing device 600 may also include a vibration device capable of initiating a vibration in the device on command, such as a mechanical vibrator or a vibrating alert motor. The aforementioned devices are only examples, and other devices may be added or substituted.

Computing device 600 may also contain a network connection device 615 that may allow device 600 to communicate with other computing devices 618, such as over a network in a distributed computing environment, for example, an intranet or the Internet. Device 615 may be a wired or wireless network interface controller, a network interface card, a network interface device, a network adapter or a LAN adapter. Device 615 allows for a communication connection 616 for communicating with other computing devices 618. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g. program module 607) may perform processes including, for example, one or more of the stages of the process 300 as described above. The aforementioned processes are examples, and processing unit 602 may perform other processes. Other programming modules that may be used in accordance with embodiments herein may include electronic mail and contacts applications, word processing applications, spreadsheet applications, database applications, slide presentation applications, drawing or computer-aided application programs, etc.

Generally, consistent with embodiments herein, program modules may include routines, programs, components, data structures, and other types of structures that may perform particular tasks or that may implement particular abstract data types. Moreover, embodiments herein may be practiced with other computer system configurations, including handheld devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general-purpose computer or in any other circuits or systems.

Embodiments herein, for example, are described above with reference to block diagrams and/or operational illustrations of methods, systems, and computer program products according to said embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system that provides private web browsing, the system comprising:
   a) a client module executing on a client computer communicably connected to a communications network, the client module configured for:
      1) transmitting client settings and a request to begin a browsing session to a web server, over the communications network;
      2) receiving and displaying video data for the browsing session from the web server, over the communications network;
      3) detecting peripheral input for the browsing session and transmitting said peripheral input to the web server, over the communications network; and
      4) receiving a user command to end the browsing session and transmitting said user command to the web server, over the communications network;
   b) a database communicably connected to the communications network, the database configured for storing at least one browser build in a non-executable directory, the at least one browser build including at least one executable browser file;
   c) a web server module executing on the web server communicably connected to the communications network, the web server module configured for:
      1) receiving the client settings and the request to begin the browsing session from the client module, over the communications network;
      2) creating a temporary executable directory in the database and copying the at least one executable browser file from the non-executable directory to the temporary executable directory;
      3) executing the at least one executable browser file in the temporary executable directory, thereby starting the browsing session, wherein all browsing session files are stored in the temporary executable directory;
      4) generating video data from the browsing session and transmitting the video data to the client module, over the communications network;
      5) receiving peripheral input for the browsing session from the client module, over the communications network, and inputting the peripheral input into the browsing session;
      6) receiving the command to end the browsing session from the client module, over the communications network; and
      7) deleting all files in the temporary executable directory.

2. The system of claim 1, wherein the client settings include favorites, login credentials and viewing preferences.

3. The system of claim 2, wherein the peripheral input includes keyboard input and mouse input.

4. The system of claim 1, wherein the at least one browser build further includes one or more sub-directories that include resource files and library files.

5. The system of claim 4, wherein browser session files includes a cache of web pages.

6. A system that provides private web browsing, the system comprising:
   a) a client module executing on a client computer communicably connected to a communications network, the client module configured for:
      1) transmitting client settings and a request to begin a browsing session to a web server, over the communications network;
      2) receiving and displaying video data for the browsing session from the web server, over the communications network;
      3) detecting peripheral input for the browsing session and transmitting said peripheral input to the web server, over the communications network; and
      4) receiving a user command to end the browsing session and transmitting said user command to the web server, over the communications network;

b) a database communicably connected to a communications network, the database configured for storing at least one browser build in a non-executable directory, the at least one browser build including at least one executable browser file;

c) a web server module executing on a web server communicably connected to the communications network, the web server module configured for:
1) receiving client settings and a request to begin the browsing session from a client computer, over the communications network;
2) creating a temporary executable directory in the database and copying the at least one executable browser file from the non-executable directory to the temporary executable directory;
3) executing the at least one executable browser file in the temporary executable directory, thereby starting the browsing session, wherein all browsing session files are stored in the temporary executable directory;
4) generating video data from the browsing session and transmitting the video data to the client computer, over the communications network;
5) receiving peripheral input for the browsing session from the client computer, over the communications network, and inputting the peripheral input into the browsing session;
6) receiving a command to end the browsing session from the client computer, over the communications network; and
7) stopping the at least one executable browser file from executing and deleting all files in the temporary executable directory.

7. The system of claim 6, wherein the client settings include favorites, login credentials and viewing preferences.

8. The system of claim 7, wherein the peripheral input includes keyboard input and mouse input.

9. The system of claim 8, wherein the at least one browser build further includes one or more sub-directories that include resource files and library files.

10. The system of claim 9, wherein browser session files includes a cache of web pages.

11. A method for providing private web browsing, the method comprising:
a) executing a client module on a client computer communicably connected to a communications network, wherein the client module:
1) transmits client settings and a request to begin a browsing session to a web server, over the communications network;
2) receives and displays video data for the browsing session from the web server, over the communications network;
3) detects peripheral input for the browsing session and transmits said peripheral input to the web server, over the communications network; and
4) receives a user command to end the browsing session and transmits said user command to the web server, over the communications network;

b) a database communicably connected to the communications network, the database configured for storing at least one browser build in a non-executable directory, the at least one browser build including at least one executable browser file;

c) executing a web server module on the web server communicably connected to the communications network, the web server module:
1) receives the client settings and the request to begin the browsing session from the client module, over the communications network;
2) creates a temporary executable directory in an attached database and copies at least one executable browser file from at least one browser build in a non-executable directory to the temporary executable directory;
3) executes the at least one executable browser file in the temporary executable directory, thereby starting the browsing session, wherein all browsing session files are stored in the temporary executable directory;
4) generates video data from the browsing session and transmits the video data to the client module, over the communications network;
5) receives peripheral input for the browsing session from the client module, over the communications network, and inputs the peripheral input into the browsing session;
6) receives the command to end the browsing session from the client module, over the communications network; and
7) deletes all files in the temporary executable directory.

12. The method of claim 11, wherein the client settings include favorites, login credentials and viewing preferences.

13. The method of claim 12, wherein the peripheral input includes keyboard input and mouse input.

14. The method of claim 13, wherein the at least one browser build further includes one or more sub-directories that include resource files and library files.

15. The method of claim 14, wherein browser session files includes a cache of web pages.

* * * * *